May 9, 1961  F. A. ZIHLMAN  2,983,135
PROPELLANT IGNITABILITY TESTING DEVICE
Filed Sept. 16, 1958  2 Sheets-Sheet 1

INVENTOR.
FREDERICK A. ZIHLMAN
BY
ATTYS.

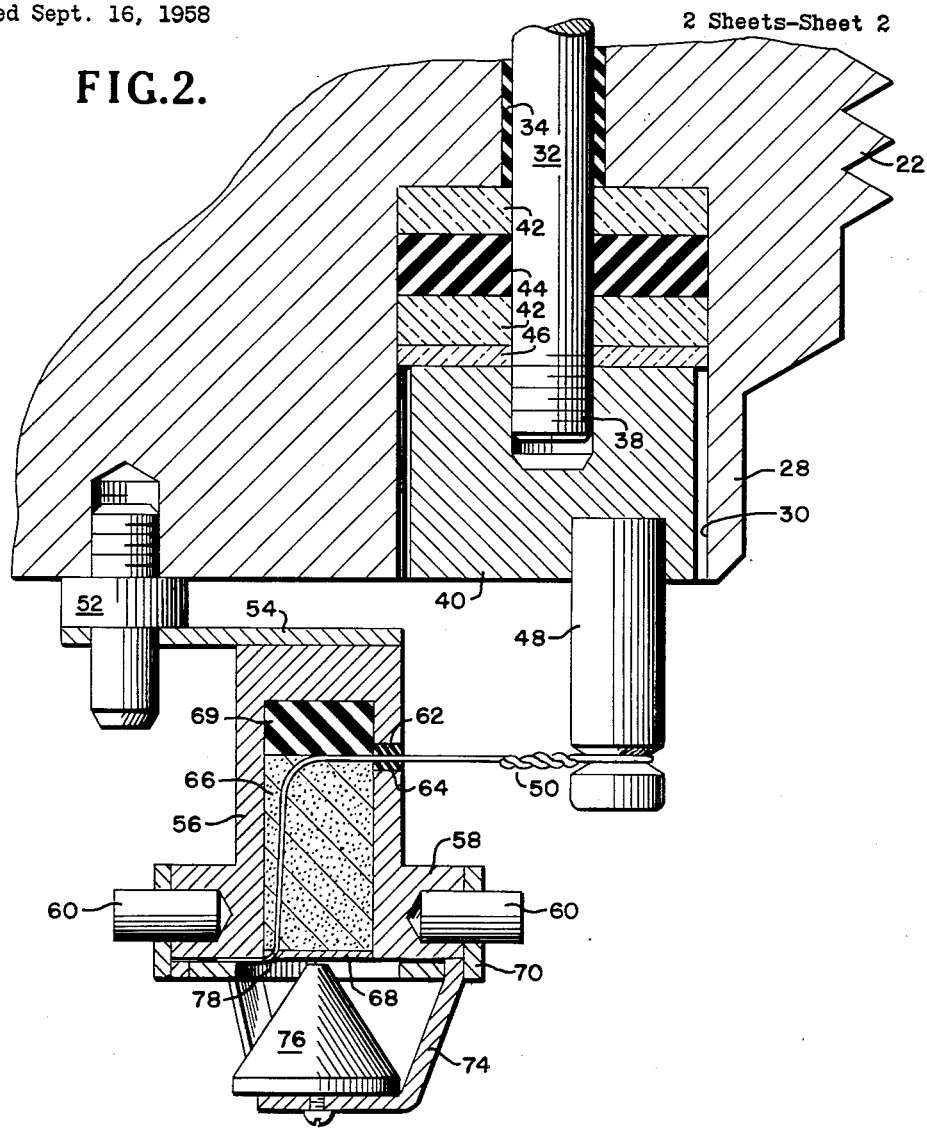
FIG.2.
FIG.3.
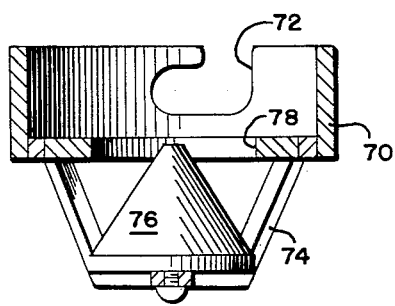
INVENTOR.
FREDERICK A. ZIHLMAN

United States Patent Office 2,983,135
Patented May 9, 1961

2,983,135

PROPELLANT IGNITABILITY TESTING DEVICE

Frederick A. Zihlman, 1 Green Meadow Court, Indian Head, Md.

Filed Sept. 16, 1958, Ser. No. 761,446

2 Claims. (Cl. 73—35)

(Granted under Title 35, U.S. Code (1952), sec. 266)

The invention described herein may be manufactured and used by or for the Government of the United States of America for governmental purposes without the payment of any royalties thereon or therefor.

This invention relates to apparatus for comparing the relative ease with which various propellant formulations may be ignited.

Previous to the apparatus of this invention it has been the custom to observe the ignition delay in the ordinary test firing of guns. This is not an advantageous procedure since it is expensive to conduct firing tests, it does not isolate the effects of the propellant and it precludes the procurement of information on small quantities of material.

One of the objects of the present invention is to provide an apparatus which will test the ability of a quantity of a propellant to ignite under simulated firing conditions.

It is a further object of the present invention to provide a fixed amount of propellant and by exposing the propellant to different size charges of ignited black powder determine the relative ability of the propellant to ignite.

It is a still further object of the present invention to provide an apparatus for testing the relative ability of various propellants to ignite when exposed to a minimum fired charge of black powder, which is easy to assemble and take apart for observation and which will provide adequate tests using relatively small amounts of the propellant.

A further object of the invention is to provide an apparatus by means of which a substantial number of propellants may be tested for ignitability and compared to a single criterion and so tabulated so that there may be a direct comparison between the various propellants.

Other objects and many of the attendant advantages of this invention will be readily appreciated as the same becomes better understood by reference to the following detailed description when considered in connection with the accompanying drawings, wherein:

Fig. 2 is an enlarged sectional view of a portion of the apparatus shown in Fig. 1; and Fig. 3 is a sectional view of the cage holding the spreading cone.

Figure 1:
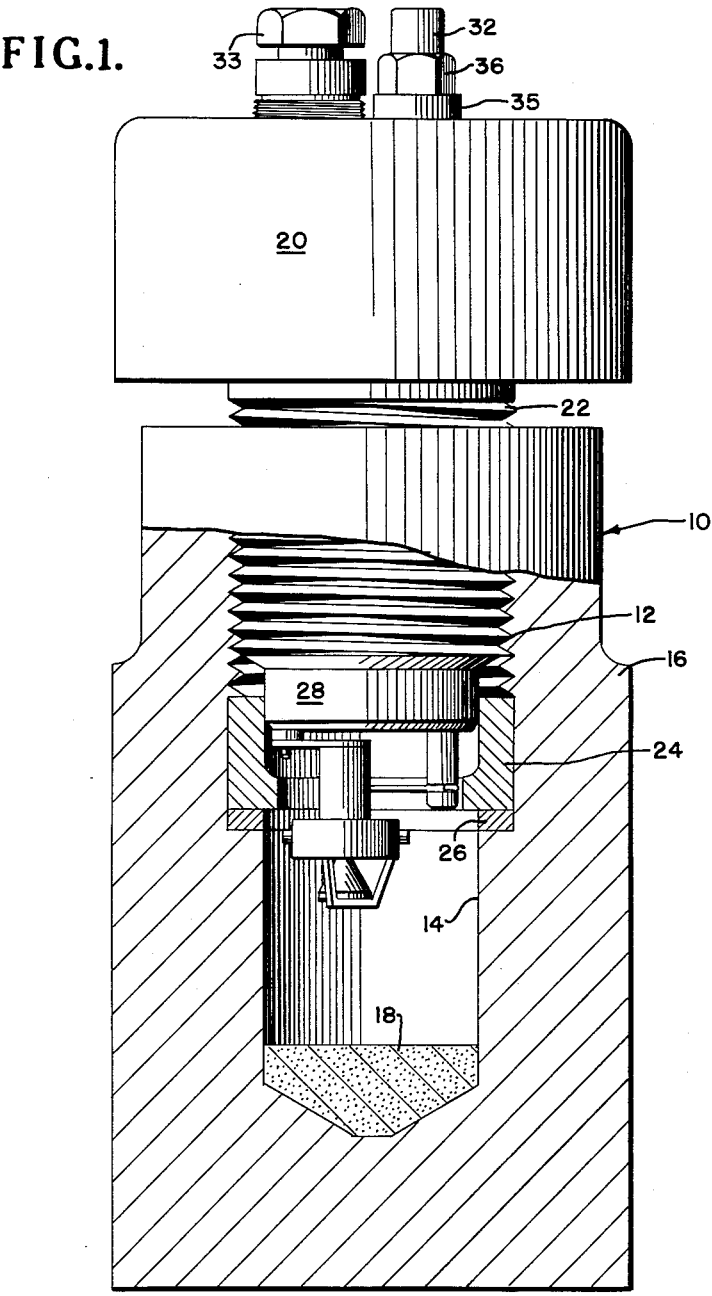
Fig. 1 is a front elevation, partly in section of an apparatus forming the subject of the invention according to a preferred embodiment thereof.

Referring now to the drawings on which like numerals of reference are employed to designate like or similar parts throughout the several views and more particularly to Fig. 1 thereof there is shown thereon a hollow metal tube 10 closed at one end and interiorly threaded at 12. In that portion beyond the threads and towards the closed end there is provided a reduced bore 14 and increased wall thickness as shown at 16. The reduced bore is of sufficient size to receive a measured quantity of propellant 18.

A plug having a head 20 and a threaded portion 22 carries a charge of igniting powder and electrical means to fire it. This plug is threaded onto the metal tube fitting and extends into a sleeve 24 which is butted against a washer 26. The plug terminates in a reduced cylindrical portion 28 formed with an off center bore 30.

Centrally located with respect to the bore 30 is a firing rod 32, Figs. 1 and 2, extending the length of the plug and insulated therefrom by the insulator sleeve 34. The rod 32 extends beyond the head 20 to receive an insulating washer 35 and is held in position by nut 36, Fig. 1. The end of the rod 32 opposite from the nut 36 extends into the off-center bore 30 and is threaded at 38 to receive a cylindrical block 40 which is smaller in diameter than the off-center bore so that the block 38 is spaced from the side of the bore 30. The firing rod 32 is further insulated and centrally spaced by the discs 42 of Micarta, a spacing disc 44 of neoprene and a washer 46 of mica.

The discs 42, 44 and 46 bear against the block 40 and serve to cushion the block against the explosion of the propellant.

Secured to the block 40 and extending into the sleeve 24 is an electrical conducting pin 48 which has connected thereto a wire 50 extending at right angles from the pin. The wire 50 is carried into the powder holder 56, insulated from the wall of the holder by the insulating bushing 64. The wire is extended across the powder holder and downward (Fig. 2) out of the holder and lies across and in contact with the rim 58 of the holder 56 to be securely wedged in place by a cone spreader.

The reduced cylindrical portion 28 of the plug carries a threaded stud 52 which supports, in spaced relation from the plug, a plate 54. The plate 54 has welded or otherwise secured thereto a powder holder 56 substantially in the form of a metal tube having an enlarged rim 58. A pair of pins 60 located diametrically opposite are carried by and project beyond the rim. The interior of the powder holder is packed with black powder 66 held in place by a single thickness of tissue paper 68. Seated in the powder holder is disc 69 insulating the wire 50 and preventing the shorting of the wire against the bottom of the powder holder during the tamping of the powder.

A cage having a cap 70 and a pair of oppositely disposed bayonet slots 72 is formed with three supports 74 equally spaced around the cap 70 and holding a spreading cone 76. The supports holding the cone may be secured to the cap 70 by press fitting or welding or other suitable methods. A central opening 78 in the cap 70 permits the charge of black powder 66 to be fired directly onto the cone 76.

In use, a definite amount of the propellant is placed in the tube and a charge of black powder in the powder holder. Previous to placing the charge of black powder in the holder, the powder is carefully weighed, and its humidity and chemical content noted. The fuse wire 50 is connected to the rod 48 and passed into the powder holder, run the length of the holder and wedged between the rim of the holder and the cap 70 of the spreading cone. This completes an electrical circuit which may be traced from the insulated firing rod 32 through the block 40, rod 48, wire 50, and the grounded powder holder 56. The electrical wires (not shown) are connected respectively to the rod 32 and the nut 33 which is grounded to the plug and through the plug to the powder holder 56. Energization of the circuit causes the fine wire 50 to be heated sufficiently to ignite the black powder 66 which burns discharging its blast against the cone 76 to be spread onto the propellant 18. For all uses relating to this invention the tube 16 is indestructible and the apparatus may be disassembled so that the propellant may be observed and the completeness of the burning noted. The above procedure is carried out up and down until the minimum amount of black powder which will ignite the propellant is determined. By repeating this process with many different propellants a comparison factor in which each propellant is compared to the minimum charge of black powder needed to ignite it which may be termed the ignitability of the propellant is determined.

After firing it is of course necessary to replace the wire 50, introduce more propellant and a black powder charge which is carefully measured and differs only from the preceding charge by amount. With the introduction of a different propellant, the same measures of black powder used to test the previous propellant should be used. Relative ignitability is described in terms of the reciprocal of the weight of black powder multiplied by some constant. With a comparison factor it is much easier to ascertain the right propellant to produce the desired result.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An apparatus for comparing the ignitability of solid propellants comprising a closed end tube housing said propellant, a plug threaded into said tube and closing said tube, a powder holder carrying a known quantity of explosive extending from the end of said plug into said tube, means for electrically igniting said explosive, and replaceable means attached to said powder holder receiving the blast of the explosive and spreading it onto the propellant to ignite said propellant and burn said propellant completely within the confines of said housing.

2. An apparatus for comparing the ignitability of solid propellants according to claim 1 wherein the replaceable means comprises a detachable cap, attached to the powder holder, and a cone carried by said cap which receives the blast of the explosive and spreads it onto the propellant.

References Cited in the file of this patent

UNITED STATES PATENTS

| | | |
|---|---|---|
| 1,801,449 | Olsen et al. | Apr. 21, 1931 |
| 2,448,203 | Africano | Aug. 31, 1948 |
| 2,493,725 | McMorris | Jan. 3, 1950 |
| 2,832,213 | Cole et al. | Apr. 29, 1958 |